United States Patent
Holzhammer

(10) Patent No.: US 11,035,288 B2
(45) Date of Patent: Jun. 15, 2021

(54) PRECHAMBER DEVICE FOR COMBUSTION ENGINE

(71) Applicant: INNIO Jenbacher GmbH & Co OG, Tyrol (AT)

(72) Inventor: Peter Johann Holzhammer, Tyrol (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 48 days.

(21) Appl. No.: 16/249,935

(22) Filed: Jan. 17, 2019

(65) Prior Publication Data
US 2019/0234293 A1 Aug. 1, 2019

(30) Foreign Application Priority Data

Feb. 1, 2018 (EP) .................................. 18154603

(51) Int. Cl.
*F02B 19/10* (2006.01)
*F02B 19/12* (2006.01)
(Continued)

(52) U.S. Cl.
CPC ............ *F02B 19/1009* (2013.01); *F01P 3/02* (2013.01); *F02B 19/16* (2013.01); *F02M 31/20* (2013.01);
(Continued)

(58) Field of Classification Search
CPC ...... F02B 19/12; F02B 19/1009; F02B 19/16; F02B 19/18; F02B 19/1033; F02B 19/1004; F02B 19/1014; F01P 3/16; H01T 13/54
(Continued)

(56) References Cited

U.S. PATENT DOCUMENTS 5,222,993 A * 6/1993 Crane ..................... F02B 19/12
123/256
6,019,081 A * 2/2000 Divecha ................. F02B 19/12
123/254
(Continued)

FOREIGN PATENT DOCUMENTS

EP    1143126 A2 * 10/2001 .............. F02B 19/12
EP    2372142 A1    10/2011
EP    3181853 A1    6/2017

OTHER PUBLICATIONS

English machine translation of Description for EP-1143126-A2 provided by ESPACENET (Year: 2020).*
(Continued)

*Primary Examiner* — Jacob M Amick
*Assistant Examiner* — Michael A Kessler
(74) *Attorney, Agent, or Firm* — Fletcher Yoder, P.C.

(57) ABSTRACT

A prechamber device for a combustion engine, the prechamber device extending from a first axial end to a second axial end along an axial direction, is provided. The prechamber device includes a prechamber body circumferentially enclosing a prechamber volume, a nozzle body extending from the prechamber body and disposed at a first axial end of the prechamber device, an interior of the nozzle body in fluid communication with and providing an appendix of the prechamber volume, and nozzle openings provided through the nozzle body from the interior to the exterior of the nozzle body. The prechamber device also includes one or more cooling channels, extending inside in the prechamber body and apart from the nozzle body from a first coolant inlet/outlet to a second coolant inlet/outlet.

20 Claims, 2 Drawing Sheets

Fig. 2

(51) Int. Cl.
  *H01T 13/54* (2006.01)
  *F01P 3/02* (2006.01)
  *F02B 19/16* (2006.01)
  *F02M 31/20* (2006.01)
  *F02P 13/00* (2006.01)

(52) U.S. Cl.
  CPC ......... *F01P 2003/024* (2013.01); *F02B 19/12* (2013.01); *F02P 13/00* (2013.01); *H01T 13/54* (2013.01)

(58) Field of Classification Search
  USPC .................................. 123/254, 169 C, 41.32
  See application file for complete search history.

(56) References Cited

U.S. PATENT DOCUMENTS

| | | | |
|---|---|---|---|
| 9,151,212 B2 | 10/2015 | Dumser et al. | |
| 10,883,413 B2* | 1/2021 | Anderson | F02B 19/12 |
| 2001/0015601 A1* | 8/2001 | Henkel | F01P 3/16 |
| | | | 313/11.5 |
| 2002/0005182 A1 | 1/2002 | Kraus et al. | |
| 2011/0214639 A1* | 9/2011 | Ishida | F02M 21/0233 |
| | | | 123/275 |
| 2011/0271930 A1* | 11/2011 | Ishida | H01T 13/54 |
| | | | 123/275 |
| 2012/0325179 A1* | 12/2012 | Herold | F01P 3/12 |
| | | | 123/254 |
| 2013/0139784 A1* | 6/2013 | Pierz | F02B 19/12 |
| | | | 123/254 |
| 2015/0083058 A1* | 3/2015 | Becker | F02F 1/40 |
| | | | 123/41.29 |
| 2016/0010538 A1* | 1/2016 | Suzuki | F02D 19/024 |
| | | | 123/292 |
| 2016/0333771 A1 | 11/2016 | Willi | |
| 2017/0138251 A1* | 5/2017 | Watanabe | F02B 19/12 |
| 2017/0167357 A1* | 6/2017 | Maier | F02B 19/12 |
| 2020/0362750 A1* | 11/2020 | Rabhi | F02F 3/00 |

OTHER PUBLICATIONS

European Search Report and Written Opinion dated Apr. 24, 2018 which was issued in connection with EP 18154603.7 which was filed on Feb. 1, 2018.

* cited by examiner

PRECHAMBER DEVICE FOR COMBUSTION ENGINE

TECHNICAL FIELD

The present disclosure relates to a prechamber device for a combustion engine as set forth in the claims. It further relates to a cylinder head and a reciprocating engine as further set forth in the claims.

BACKGROUND OF THE DISCLOSURE

Certain types of internal combustion engines, in particular reciprocating internal combustion engines, are equipped with prechambers which facilitate fast and complete ignition of a fuel-oxidizer mixture provided in a combustion chamber. In a prechamber, volume a partial volume of the fuel-oxidizer mixture is ignited by an ignition source, such as, for instance, a spark plug. The prechamber device which encloses the prechamber volume comprises nozzle openings at one axial end of the prechamber device, through which jets of burning mixture and/or hot combustion products and/or plasma are emitted into the main combustion chamber, which deeply penetrate into the main combustion chamber and cause a fast and complete ignition of the fuel-oxidizer mixture provided in the main combustion chamber. Efficiency, for instance of reciprocating engines, is thus improved, and emission control may be facilitated.

As is well-known to the person having ordinary skill in the art, such prechamber devices are commonly provided in the cylinder head of reciprocating engines. In embodiments, one prechamber device may be provided per cylinder.

As will be readily appreciated, the prechamber devices are subjected to significant thermal loads. US 2013/0139784 proposes to provide a prechamber device as a kind of sandwich construction, in which a support structure is provided which is made from a material having a relatively higher mechanical strength and a relatively lower thermal conductivity, and members of a material yielding a relatively lower mechanical strength and a relatively higher thermal conductivity are embedded within the support structure. US 2016/0333771 discloses a prechamber device extending from a first axial end to a second axial end along an axial direction, the prechamber device comprising a prechamber body circumferentially enclosing a prechamber volume. A nozzle body extends from the prechamber body at a first axial end of the prechamber device, wherein an interior of the nozzle body is in fluid communication with and provides an appendix of the prechamber volume. Nozzle openings are provided through the nozzle body from the interior to the exterior of the nozzle body. The prechamber device is equipped with cooling channels. The cooling channels extend from a first inlet/outlet provided at an outer lateral surface of the prechamber body into the nozzle body, are reversed inside the nozzle body, and further extend to a second inlet/outlet provided at an outer lateral surface of the prechamber body.

BRIEF DESCRIPTION OF THE DISCLOSURE

It is an object of the present disclosure to disclose a device of the type initially mentioned. In a more specific aspect, an improved device of the type initially mentioned shall be disclosed. In a further more specific aspect, a prechamber device comprising a cooling arrangement shall be disclosed. Still more specifically, a prechamber device shall be disclosed which is equipped with a cooling arrangement for the prechamber body. In further aspects, a compact prechamber device shall be disclosed. A compact prechamber device yields benefits like the ability to build more compact cylinder heads for reciprocating engines, and an enhanced ease of installing the prechamber device and de-installing the prechamber device for maintenance and replacement activities. Further, reducing the overall cross-sectional dimension of a prechamber device and any further members attached thereto allows to extend the applicability of prechamber technology to reciprocating engines having smaller cylinder bores, and generally to smaller engines which make accordingly also benefit from the use of prechamber technology. A prechamber device comprising a nozzle body having a small cross-sectional dimension yields the benefit of requiring and accordingly small opening in the cylinder head to extend into the combustion chamber.

This is achieved by the subject matter described in claim 1.

Further effects and benefits of the disclosed subject matter, whether explicitly mentioned or not, will become apparent in view of the disclosure provided below.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

Accordingly, disclosed is a prechamber device for a combustion engine, the prechamber device extending from a first axial end to a second axial end along an axial direction. The prechamber device comprises a prechamber body circumferentially enclosing a prechamber volume, and a nozzle body extending from the prechamber body and disposed at a first axial end of the prechamber device. The prechamber device may in particular be provided as an integral, one-piece embodiment, with the prechamber body and the nozzle body being provided integral with each other in one single monolithic piece. An interior of the nozzle body is in fluid communication with and provides an appendix of the prechamber volume. Nozzle openings are provided through the nozzle body from the interior to the exterior of the nozzle body. The prechamber device is equipped with one or more cooling channels. At least one cooling channel extends inside in the prechamber body and apart from the nozzle body from a first coolant inlet/outlet to a second coolant inlet/outlet. In particular embodiments, the first and second coolant inlet/outlets may be arranged at different axial positions. It is understood that in embodiments a coolant inlet/outlet may for instance be provided and referred to as a coolant inlet/outlet opening, as a coolant port, and/or as a coolant orifice. The first and second coolant inlet/outlets may in embodiments accordingly be provided referred to as first and second coolant inlet/outlet openings, as first and second coolant ports, and/or as first and second coolant orifices. In more particular embodiments, all cooling channels out of a plurality of cooling channels extend inside the prechamber body and apart from the nozzle body. In that the cooling channels extends inside the prechamber body and apart from the nozzle body, the cooling channels do not interfere with the nozzle openings provided through the nozzle body. Further, the material of the thermally and mechanically highly loaded nozzle body is not weakened by cooling channels extending through the nozzle body. The nozzle body may thus be provided with a wall circumscribing and delimiting the interior of the nozzle body which is, except for the nozzle openings, solid and unperforated. The inventor has discovered that, in effectively cooling the prechamber body, a driving temperature gradient from the nozzle body to the prechamber body may be achieved which fosters heat conduction from the nozzle body to the prechamber body and thus effectively supports cooling of the nozzle body. Further, strong spatial temperature gradients inside the nozzle body due to the presence of discrete cooling channels inside the nozzle body are avoided. Summarizing, the disclosed subject matter effectively supports cooling of the nozzle body through heat conduction to the prechamber body while maintaining a less inhomogeneous temperature distribution inside the nozzle body when compared to direct convective cooling of the nozzle body in providing the cooling channels directly inside the nozzle body. Further, with comparable mechanical strength, the nozzle body can be built smaller when compared to a nozzle body with integrated cooling channels, in particular when referring to the cross-sectional dimension of the nozzle body.

In further embodiments, that the at least one cooling channel extends unidirectionally from a first coolant inlet/outlet to a second coolant inlet/outlet. In more specific embodiments, due to the fact that the cooling channels do not extend into the nozzle body, it is possible to shape the at least one cooling channel so as to extend unidirectionally from a first coolant inlet/outlet to a second coolant inlet/outlet. Unidirectional in this respect shall be understood as following one main direction and no section extending in a direction opposite the main direction while following the extent of the cooling channel from one coolant inlet/outlet to the other coolant inlet/outlet of the cooling channel. The main direction may in particular be defined from the first coolant inlet/outlet to the second coolant inlet/outlet. The skilled person will in this respect appreciate that the prechamber body is intended to be embedded in a cylinder head, and in a region of the cylinder head in which coolant jackets are provided. The nozzle body extends into a wall of the cylinder head adjacent the combustion chamber and through an opening of the cylinder head into the combustion chamber. It is thus possible to provide coolant inlet/outlets in the prechamber body which are intended to be in fluid communication with the coolant jackets, which is not possible in the nozzle body. Therefore, a cooling channel provided in the nozzle body needs to extend from a first inlet/outlet in a distal direction into the nozzle body, and needs to turn the direction to proximally extend to a second coolant inlet/outlet. It shall be noted in this respect that the term "distal" shall be understood in the sense of "far", "away" or "pointing away from", while the terms "proximate" and "proximal" shall be understood in the sense of "close", "towards" or "pointing towards". As the cooling channels according to the present disclosure do not require tight bents, the risk of potentially fatal plugging of a cooling channel is significantly reduced. Moreover, if the prechamber device is mounted in an orientation in which the first and second coolant inlet/outlets are positioned at different vertical positions, the unidirectional extent of the cooling channels fosters natural convection inside the cooling channels and thus turns the throughflow of coolant inherently safe.

In more particular instances of the herein described prechamber device, all cooling channels out of a plurality of cooling channels extend unidirectionally from a first coolant inlet/outlet of the respective cooling channel to a second coolant inlet/outlet of the respective cooling channel.

In still further aspects, it may be provided that the at least one cooling channel is restricted to, i.e. does not extend beyond, an axial section of the prechamber body which is defined between the coolant inlet/outlets of the cooling channel. In even still further aspects it may be provided that all cooling channels out of a multitude of cooling channels are restricted to, i.e. do not extend beyond, an axial section of the prechamber body which is defined between the respective coolant inlet/outlets of the cooling channel.

In instances of the herein described prechamber device, at least one of the first and second coolant inlet/outlets is provided in an outer lateral surface of the prechamber body, and the respective cooling channel comprises an inlet or outlet elbow extending from the laterally arranged coolant inlet/outlet. In even more specific instances, both of the coolant inlet/outlets of a cooling channel are provided in an outer lateral surface of the prechamber body, and the respective cooling channel comprises an inlet elbow and an outlet elbow, each extending from one of the laterally arranged coolant inlet/outlets. It will be understood that despite the elbows being provided the cooling channels may still extend unidirectionally from the first to the second coolant inlet/outlet. The elbows may in particular be provided and shaped so as not to form an arch which introduces a section of the cooling channel which is oriented opposite the main direction from the first to the second coolant inlet/outlet.

In instances of the prechamber device, and in particular if it is provided with a cooling channel which comprises a bent or elbow, the prechamber device may in particular be manufactured by precision casting or by additive manufacturing methods like for instance, while not limited to, those known in the art as Selective Laser Melting (SLM) and Electron Beam Melting (EBM).

In further exemplary embodiments at least one lateral ledge may be provided at the prechamber body, the ledge having an axially facing face, wherein at least one coolant inlet/outlet of a cooling channel is provided in the axially facing face. In this instance the cooling channel may at least partly be manufactured by a chip removing manufacturing method, for instance drilling. In more specific exemplary embodiments, the prechamber device comprises at least one first ledge and at least one second ledge, wherein each of said first ledge and said second ledge exhibit an axially facing face. The axially facing face of the first ledge and the axially facing face of the second ledge face different axial directions. At least one coolant inlet/outlet is provided in each of said first and said second ledge, and at least one cooling channel extends from a coolant inlet/outlet provided in said first ledge to a coolant inlet/outlet provided in said second ledge. In particular, the cooling channel may extend straight from the first ledge to the second ledge. The cooling channel, including the respective coolant inlet/outlets, may in this case particularly easy be manufactured by a chip removing method, for instance by drilling a through hole extending from one ledge to the other ledge. Further, in other aspects, at least one ledge may be provided circumferentially extending on an outer side of the prechamber body, wherein at least one coolant inlet/outlet is provided in an axially facing face of said at least one ledge. In even more specific aspects, a first and a second ledge may be provided circumferentially extending on an outer side of the prechamber body, wherein each of said first and second ledges exhibits an axially facing face. The axially facing faces of said first and second ledges face different axial directions, wherein a body is provided between said first and second ledges. In particular, at least one coolant inlet/outlet is provided in the axially facing face of each of said first and second ledges, and more in particular a cooling channel is provided extending form each coolant inlet/outlet provided in the axially facing face of the first ledge to a coolant inlet/outlet provided in the axially facing face of the second ledge and through the body.

In specific embodiments of the described subject matter a plurality of cooling channels are provided in the prechamber body and circumferentially distributed along a circumferential extent of the prechamber body, wherein each cooling channel extends unidirectionally from a first coolant inlet/outlet to a second coolant inlet/outlet, and wherein each of the first and second coolant inlet/outlets of each coolant channel are provided at different positions along the axial extent of the prechamber device. It may be provided that all first coolant inlet/outlets of all cooling channels are provided closer to a nozzle end of the prechambers device, or to the nozzle body, respectively, than any of the second coolant inlet/outlets of the cooling channels. In even more particular instances, all first coolant inlet/outlets may be located at one first axial location on the prechamber body and/or all second cooling inlet/outlets may be located at one second axial location on the prechamber body.

In further aspects of the present disclosure, a prechamber device for a combustion engine is disclosed, the prechamber device extending from a first axial end to a second axial end along an axial direction. The prechamber device comprises a prechamber body circumferentially enclosing a prechamber volume and a nozzle body extending from the prechamber body at a first axial end of the prechamber device. An interior of the nozzle body is in fluid communication with and providing an appendix of the prechamber volume, and nozzle openings are provided through the nozzle body from the interior to the exterior of the nozzle body. An inlet opening is provided on a lateral side of the prechamber device and extends through the prechamber body from an outside of the prechamber body to the prechamber volume. A valve intended as a prechamber inlet control valve may be attached to the prechamber body and in fluid communication with the inlet opening. In other aspects, as connection means, for instance a thread, is provided at the prechamber body and intended to receive a valve in fluid communication with the inlet opening as a prechamber inlet control valve. Said prechamber device may or may not be provided with cooling channels as outlined above. The prechamber device with an integrated, or directly attached, respectively, inlet control valve is significantly more compact than a prechamber device with the gas valve provided in the spark plug sleeve and a prechamber gas cavity in an upper region of the cylinder head. In particular, the significantly reduced cross-sectional dimension of the prechamber device with the spark plug sleeve allows application of an accordingly designed prechamber device to small bore engines. This significantly expands the applicability of prechamber technology to smaller engines.

Generally, an axial end of the prechamber device opposite the nozzle body may be equipped with a means to receive and attach an ignition device. For instance, a female thread extending into the prechamber cavity and provided and configured to receive an ignition device, as for instance a spark plug, may be provided.

Further disclosed is a cylinder head which comprises at least one prechamber device of any type outlined above. In particular, this may be a prechamber device comprising at least one cooling channel, wherein the at least one cooling channel of the prechamber device provides fluid communication between a first and a second coolant jacket provided in the cylinder head. In particular if the prechamber device is installed in an upright position, or with the coolant inlet/outlets of a cooling channel being provided at different geodetic positions, natural convection of a cooling fluid inside the cooling channel develops upon heat intake, thus providing for an inherently safe coolant flow from one of the coolant jackets to the other one of the coolant jackets through the cooling channel.

Further disclosed is a cylinder head which comprises at least one prechamber device of any type outlined above comprising a valve intended as a prechamber inlet control valve attached to the prechamber body and in fluid communication with an inlet opening of the prechamber device. In particular, a prechamber supply cavity is provided between the prechamber body and the cylinder head. In particular, the cylinder head comprises at least one intake port which is arranged and configured to be in fluid communication with the prechamber inlet control valve and further provided and configured to provide a combustible fuel-oxidizer mixture to the prechamber volume through the inlet control valve.

Further disclosed is a reciprocating engine comprising a cylinder head of any type outlined above.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a part sectional view of a first exemplary embodiment of a prechamber device.

DETAILED DESCRIPTION

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

Figure 1:
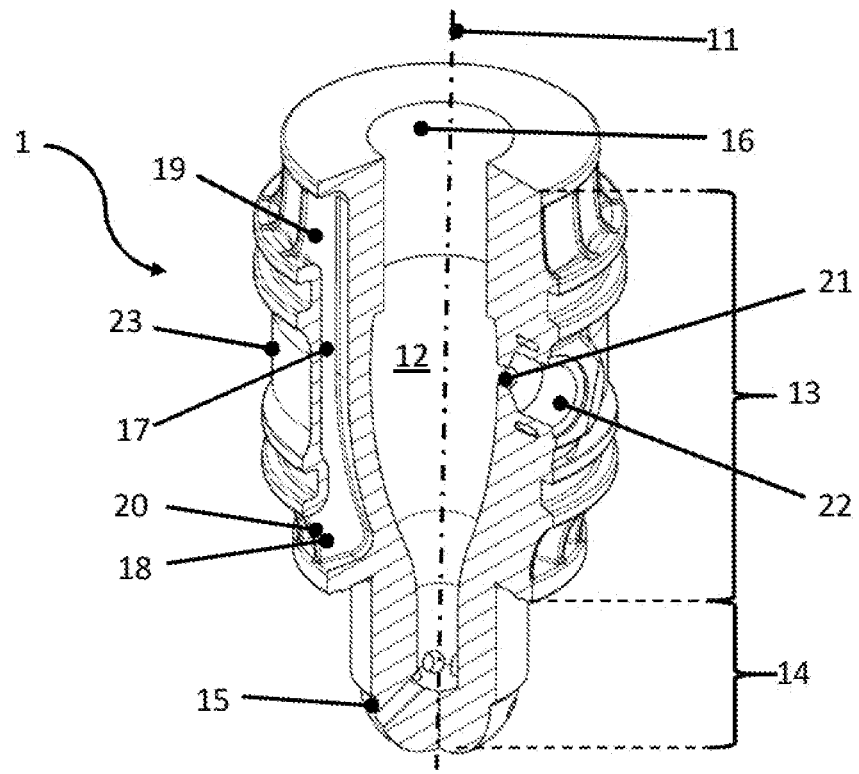

FIG. 1 depicts a first exemplary embodiment of a prechamber device 1 as herein disclosed. The prechamber device extends along an axis 11 from a first axial end to a second axial end along an axial direction. A prechamber body 13 circumferentially encloses a prechamber volume 12. A nozzle body 14 extends from the prechamber body and is disposed at a first axial end of the prechamber device. An interior of the nozzle body is in fluid communication with and provides an appendix of the prechamber volume 12. Nozzle openings 15 are provided through the nozzle body 14 and provides a fluid communication between the interior of the nozzle body and an exterior of the nozzle body. As well be appreciated by virtue of FIG. 3 and the description thereto provided below nozzle openings 15 are intended to provide a fluid communication between the prechamber volume 12 and a combustion chamber. Prechamber volume 12 is open at an axial end opposite the nozzle body. The interior wall of the prechamber body at said second axial end opposed the nozzle body is provided with suitable means 16 for receiving and attaching an ignition device. Means 16 may be a female thread disposed inside prechamber body 13 at the second axial end thereof and suitable for threadedly receiving a spark plug. A plurality of cooling channels 17, one of which is visible in the sectional view of FIG. 1, are disposed inside prechamber body 13. The channels may be circumferentially distributed around the circumference of prechamber body 13. In certain instances, they may be, at least essentially, evenly distributed around the circumference of prechamber body 13. The cooling channels 17 may be circumferentially divided from each other by lamellae 20. Each cooling channel extends unidirectionally from a first coolant inlet/outlet 18 to a second coolant inlet/outlet 19. It is understood that in embodiments a coolant inlet/outlet may for instance be provided and referred to as a coolant inlet/outlet opening, as a coolant port, and/or as a coolant orifice. The first and second coolant inlet/outlets may in embodiments accordingly be provided referred to as first and second coolant inlet/outlet openings, as first and second coolant ports, and/or as first and second coolant orifices. The coolant inlet/outlets are provided in a circumferential lateral surface of prechamber body 13 and provide fluid communication between cooling channels 17 and an exterior of the prechamber body. As noted, cooling channels 17 extent unidirectionally. That is to say, following the course of a cooling channel from first coolant inlet/outlet 18 to second coolant inlet/outlet 19, the cooling channel follows a main direction defined from first coolant inlet/outlet 18 to second coolant inlet/outlet 19 and does not include any section running in an opposite direction to said main direction when following said course along the cooling channel. In the exemplary embodiment provided in FIG. 1 cooling channel 17, despite elbows being provided adjacent the coolant inlet/outlets, runs from first coolant inlet/outlet 18 to second coolant inlet/outlet 19 unidirectionally in an axial direction pointing from the first, nozzle-side axial end of the prechamber device towards the opposed second axial end of the prechamber device. There is no section provided in cooling channel 17 where it would, following the course from one coolant inlet/outlet to the other coolant inlet/outlet, run in an opposite axial direction. The cooling channels are provided inside and restricted to the prechamber body and are apart from the nozzle body. That is, in other words, the cooling channels do not extend into the nozzle body. The nozzle body thus provides a wall circumscribing and delimiting the interior of the nozzle body 14 which is, except for nozzle openings 15, solid and unperforated. A strong and solid wall thickness of the nozzle body may thus be achieved while maintaining a small cross-sectional dimension of the nozzle body. The mechanical strength of the wall of the nozzle body is important as the nozzle body extends into the combustion chamber and is thus subject to high pressure induced forces, which, in a reciprocating engine, are moreover cyclic transient forces. Further, the nozzle body extending into the combustion chamber requires a suitable opening in the cylinder head, which structurally weakens the cylinder head. It may thus be found beneficial to keep the opening in the cylinder head as small as possible, which in turn requires a small cross-sectional dimension of the nozzle body.

The exemplarily shown prechamber device moreover comprises an inlet opening 21 provided on a lateral side of the prechamber device and extending through the prechamber body from an exterior of the prechamber body to the prechamber volume 12. A female thread 22 is provided in connection and fluid communication with inlet opening 21. Female thread 22 is adapted and configured to threadedly receive a valve which is intended to control flow of a combustible mixture into prechamber volume 12. A circumferential flute 23 is provided on the outside of prechamber body 13 and is axially delimited by two rims. Inlet opening 21 and female thread 22 are located inside and in fluid communication with flute 23.

Figure 2:
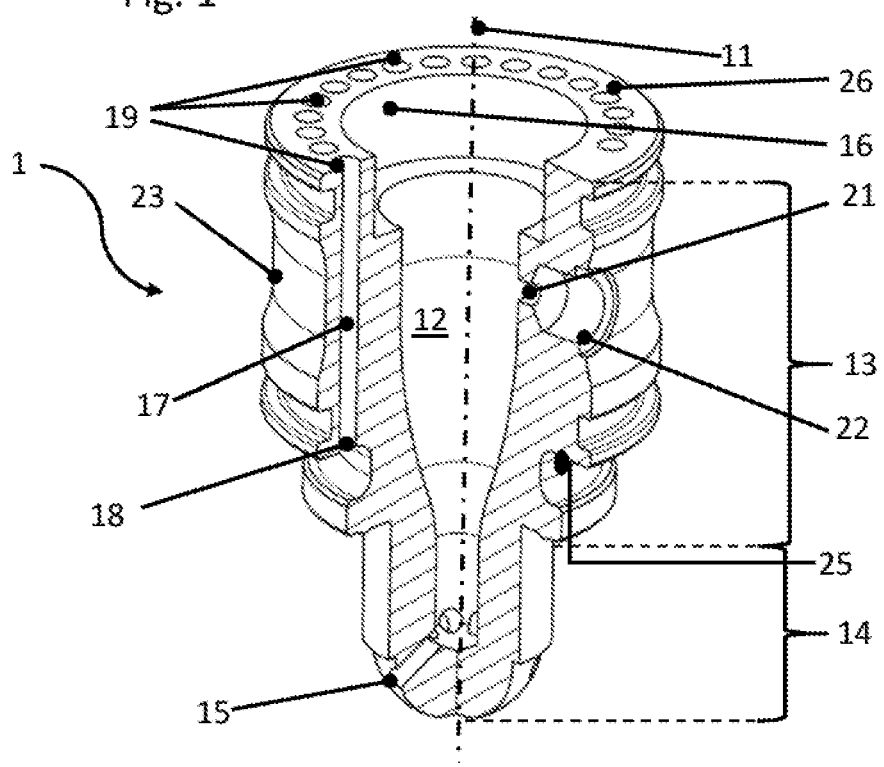
FIG. 2 a part sectional view of a second exemplary embodiment of a prechamber device.

FIG. 2 shows another exemplary embodiment of a prechamber device as disclosed herein. A major difference when compared to the embodiment shown in FIG. 1 is that the cooling channels are designed such as to be manufactured by a chip removing manufacturing method, for instance by drilling. To this extent, circumferentially extending first and second ledges 25, 26 are provided. Both ledges have axially facing faces, which face different axial directions. For instance, first ledge 25 faces a direction towards the nozzle end of the prechamber device, while second ledge 26 faces the opposite axial direction. A body material is provided axially between the ledges, with the cooling channels extending through said body. The first and second coolant inlet/outlets 18 and 19 are provided in the ledges. The skilled person will appreciate that in this embodiment the cooling channels may particularly easy be manufactured in drilling holes from the second ledge 26 through the prechamber body 13 and exiting at the first ledge 25. Other features are generally similar to those shown in the embodiment of FIG. 1.

Figure 3:
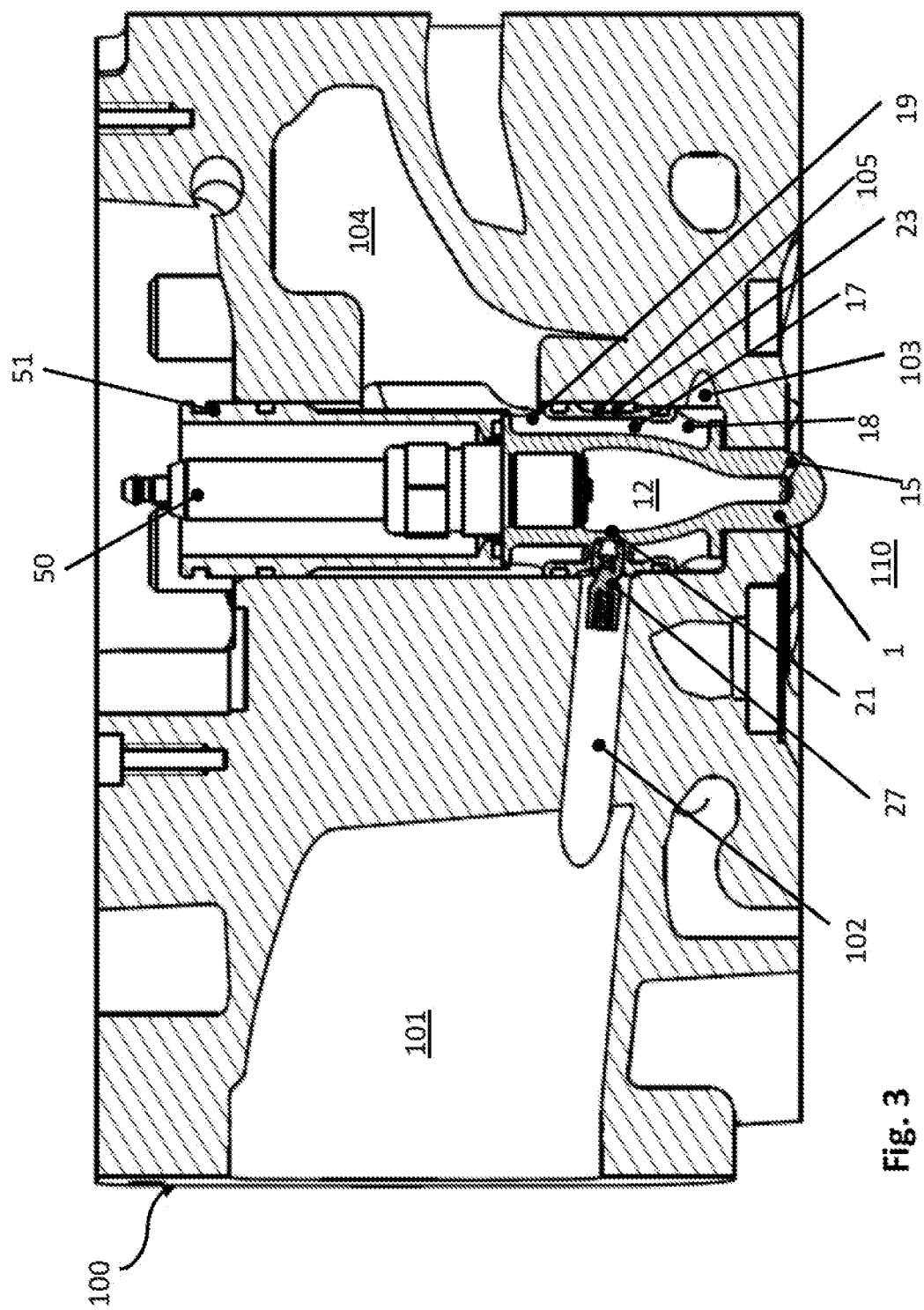
FIG. 3 a sectional view of a cylinder head accommodating a prechamber device generally of the type herein disclosed.

FIG. 3 shows an exemplary embodiment of a cylinder head 100 incorporating a prechamber device generally of the type outlined above. Prechamber device 1 is mounted in cylinder head 100 with a tip of the nozzle body extending through an opening in the cylinder head into combustion chamber 110. Cylinder head 100 comprises a supply plenum 101 in which a combustible mixture is provided. Intake port 102 branches off supply plenum 101 to supply a combustible mixture to prechamber volume 12 of prechamber device 1. Prechamber inlet control valve 27 is attached to prechamber device 1 at female thread 22 shown in FIGS. 1 and 2, and in fluid communication with inlet opening 21. Prechamber inlet control valve 27 is moreover in fluid communication with intake port 102. Further, an igniter 50, for instance a spark plug, is threadedly received in an upper end of the prechamber device in a female thread as shown at 16 in FIGS. 1 and 2. Igniter 50 is provided in an igniter sleeve or spark plug sleeve 51. Prechamber volume 12 is in fluid communication with combustion chamber 110 through nozzle openings 15. In a manner the skilled person is perfectly familiar with, prechamber inlet control valve 27 opens and closes synchronously with the working cycle of a reciprocating engine to which cylinder head 100 belongs. Control valve 27 for instance opens when a cylinder to which combustion chamber 110 belongs is in a suction cycle, thus allowing combustible mixture from supply plenum 101 to flow into prechamber volume 12 through intake port 102, open inlet control valve 27 and inlet opening 21. It is understood that prechamber inlet control valve 27 is closed during other phases of the reciprocating engine working cycle. At a suitable instant during compression of the volume in combustion chamber 110, igniter 50 ignites the combustible mixture inside prechamber volume 12, which causes jets of burning combustible mixture and/or hot combustion products and/or plasma to be ejected into combustion chamber 110 through nozzle openings 15. High momentum jets emanating from nozzle openings 15 deeply penetrate into the compressed combustible mixture in combustion chamber 110 and cause a large-scale ignition of said combustible mixture, resulting in a fast combustion inside combustion chamber 110. In that inlet control valve 27 is attached to the outer lateral surface of prechamber device 1 and provided inside intake port 102, for instance spark plugs sleeve 51 can be designed significantly smaller when compared to conventional designs. Thus, less space inside the cylinder head is required, potentially enabling a structurally stronger design of the cylinder head. Moreover, due to the significantly reduced cross-sectional dimension of the combined prechamber device and spark plug sleeve an accordingly designed prechamber device is applicable in connection with engines having comparatively small cylinder bores, which significantly expands applicability of prechamber technology to smaller engines. Flute 23 on the outer lateral surface of prechamber device 1 in connection with counterpart structures of the cylinder head forms a prechamber supply cavity 105 in fluid communication with inlet control valve 27. Prechamber supply cavity 105 is, in the axial direction of prechamber device 1, delimited by circumferential rims on the outer side of prechamber device 1, as outlined above in connection with FIGS. 1 and 2. Cylinder head 100 further comprises a lower coolant jacket 103 and an upper coolant jacket 104. Prechamber supply cavity 105 is interposed between lower coolant jacket 103 and upper coolant jacket 104. An appropriate sealing is provided so as to prevent coolant leakages into prechamber supply cavity 105 as well as any gas leakage from supply cavity 105 into the coolant. First coolant inlet/outlets 18 of prechamber device 1 are in fluid communication with lower coolant jacket 103. Second coolant inlet/outlets 19 of prechamber device 1 are in fluid communication with upper coolant jacket 104. Cooling channels 17 thus provide a fluid communication between lower coolant jacket 103 and upper coolant jacket 104. Coolant conveyed between upper and lower coolant jackets 103 and 104 thus flows through cooling channel 17 and effects cooling off prechamber device 1. For one instance, natural convection may drive coolant from lower coolant jacket 103 through cooling channels 17 into upper coolant jacket 104, thus adding inherent safeness to the cooling of the prechamber device in case that for instance a coolant pump fails.

As noted above, the cooling channels do not extent into the nozzle body of prechamber device 1. It has been discovered that, when the prechamber body is effectively cooled, a driving temperature differential between the nozzle body and the prechamber body is sufficient to effect conductive cooling of the nozzle body. The omission of liquid cooling of the nozzle body on the other hand yields the benefit that, as is evident from FIG. 3, the nozzle body is provided with a comparatively large solid wall thickness, and, except for the nozzle openings, unperforated material. Thus, the required mechanical strength can be provided while maintaining the cross-sectional dimension of the nozzle body small, which in turn allows the through opening of the cylinder head through which the nozzle body extends into the combustion chamber to be accordingly small.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

What we claim is:

1. A system, comprising:
   a prechamber device for a combustion engine, wherein the prechamber device extends from a first axial end to a second axial end along an axial direction, the prechamber device comprising:
   a prechamber body circumferentially enclosing a prechamber volume;
   a nozzle body extending from the prechamber body and disposed at the first axial end of the prechamber device, wherein an interior of the nozzle body is in fluid communication with and provides an appendix of the prechamber volume;
   one or more nozzle openings through the nozzle body from the interior to an exterior of the nozzle body, wherein the one or more nozzle openings are configured to output one or more jets resulting from combustion of a first combustible mixture in the prechamber volume to cause combustion of a second combustible mixture in a combustion chamber of the combustion engine; and
   one or more cooling channels extending inside the prechamber body between first and second coolant ports, wherein the one or more cooling channels are disposed over an axial distance along the prechamber volume; and
   an inlet opening on a lateral side of the prechamber device, wherein the inlet opening extends through the prechamber body from an outside of the prechamber device to the prechamber volume, and wherein a valve is attached to the prechamber body and in fluid communication with the inlet opening.

2. The system according to claim 1, wherein the one or more cooling channels extend inside only the prechamber body and apart from the nozzle body.

3. The system according to claim 1, wherein the one or more cooling channels extend unidirectionally from the first coolant port to the second coolant port.

4. The system according to claim 1, wherein the first coolant port is disposed in an outer lateral surface of the prechamber body.

5. The system according to claim 4, wherein the second coolant port is disposed in the outer lateral surface of the prechamber body.

6. The system according to claim 1, wherein the prechamber body comprises a first ledge having a first axially facing surface, wherein the first coolant port is disposed in the first axially facing surface.

7. The system according to claim 6, wherein the prechamber body comprises a second ledge having a second axially facing surface, wherein the first and second axially facing surfaces face different axial directions, wherein the second coolant port is disposed in the second axially facing surface.

8. The system according to claim 7, wherein the one or more cooling channels extend straight between the first and second coolant ports.

9. The system according to claim 1, wherein the prechamber body comprises a flute and first and second ledges circumferentially extending about a lateral side of the prechamber body, wherein the flute is disposed axially between the first and second ledges, wherein the flute extends along the prechamber volume and the one or more cooling channels.

10. The system according to claim 1, wherein the one or more cooling channels extend only axially between the first and second coolant ports.

11. The system according to claim 1, wherein the prechamber device is a single monolithic structure.

12. The system according to claim 1, comprising a cylinder head having the prechamber device, wherein at least one cooling channel of the one or more cooling channels of the prechamber provides fluid communication between a first coolant jacket and a second coolant jacket in the cylinder head.

13. The system according to claim 12, comprising a reciprocating engine having the cylinder head.

14. The system according to claim 1, wherein the prechamber body comprises an igniter receptacle coaxial with a central axis of the prechamber device, wherein the igniter receptacle is configured to mount an igniter.

15. A system, comprising:
 a prechamber configured to couple to a combustion engine having a combustion chamber, wherein the prechamber comprises:
 a prechamber body comprising a prechamber volume, wherein the prechamber body comprises a lateral fluid inlet into the prechamber volume;
 a nozzle body comprising an interior in fluid communication with the prechamber volume, wherein the nozzle body comprises one or more nozzle openings configured to output one or more jets resulting from combustion of a first combustible mixture in the prechamber volume to cause combustion of a second combustible mixture in the combustion chamber of the combustion engine; and
 one or more cooling channels configured to flow a coolant, wherein the one or more cooling channels extend inside the prechamber body over an axial distance along the prechamber volume, and the prechamber volume is disposed axially between the interior of the nozzle body and a location of ignition provided by an igniter of the prechamber.

16. The system according to claim 15, wherein the lateral fluid inlet is configured to supply the first combustible mixture into the prechamber volume, the one or more cooling channels overlap an axial position of the lateral fluid inlet, and the prechamber further comprises a valve configured to control a flow of the first combustible mixture.

17. The system according to claim 15, wherein the prechamber body comprises an igniter receptacle coaxial with a central axis of the prechamber, wherein the igniter receptacle is configured to mount an igniter.

18. The system according to claim 15, wherein the one or more cooling channels extend inside the prechamber body over the axial distance along the prechamber volume between first and second coolant ports, the lateral fluid inlet is disclosed axially between the first and second coolant ports, and the lateral fluid inlet is disposed axially between the interior of the nozzle body and the location of ignition provided by the igniter.

19. A system, comprising:
 a prechamber configured to couple to a combustion engine having a combustion chamber, wherein the prechamber comprises:
 a prechamber body having a sidewall extending circumferentially around a prechamber volume;
 a lateral fluid inlet through the sidewall into the prechamber volume, wherein the lateral fluid inlet is configured to supply a first combustible mixture into the prechamber volume, wherein combustion of the first combustible mixture in the prechamber volume causes combustion of a second combustible mixture in the combustion chamber of the combustion engine; and
 one or more cooling channels extending inside the sidewall over an axial distance along the prechamber volume, wherein the prechamber volume is disposed axially between a location of ignition provided by an igniter of the orechamber and a distal end surface of the prechamber, and the distal end surface is configured to be exposed to the combustion chamber of the combustion engine.

20. The system according to claim 19, wherein the axial distance of the one or more cooling channels overlaps an axial position of the lateral fluid inlet, and the lateral fluid inlet is disposed axially between the location of ignition provided by the igniter and the distal end surface.

* * * * *